(12) United States Patent
Watanabe et al.

(10) Patent No.: US 12,468,906 B2
(45) Date of Patent: Nov. 11, 2025

(54) BAGGAGE SEARCH METHOD AND A BAGGAGE INFORMATION MANAGEMENT SYSTEM

(71) Applicant: DENSO WAVE INCORPORATED, Aichi-pref. (JP)

(72) Inventors: Atsushi Watanabe, Chita-gun (JP); Takayoshi Kamiya, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 193 days.

(21) Appl. No.: 18/276,994

(22) PCT Filed: Jan. 11, 2022

(86) PCT No.: PCT/JP2022/000576
§ 371 (c)(1),
(2) Date: Feb. 1, 2024

(87) PCT Pub. No.: WO2022/172671
PCT Pub. Date: Aug. 18, 2022

(65) Prior Publication Data
US 2025/0165735 A1 May 22, 2025

(30) Foreign Application Priority Data
Feb. 11, 2021 (JP) ................................ 2021-020317

(51) Int. Cl.
*G06K 7/10* (2006.01)
*G06K 19/077* (2006.01)

(52) U.S. Cl.
CPC ... *G06K 7/10366* (2013.01); *G06K 19/07758* (2013.01)

(58) Field of Classification Search
CPC .................. G06K 7/10366; G06K 19/07758
(Continued)

(56) References Cited

U.S. PATENT DOCUMENTS 11,763,209 B1 * 9/2023 Srinivasan ......... G06Q 30/0281
705/5
2013/0335198 A1 * 12/2013 Xue ........................ G06F 21/31
340/10.1
(Continued)

FOREIGN PATENT DOCUMENTS

EP          3 113 091 A1   1/2017
JP          2020-087171 A  6/2020
KR          10-0798741 B1  1/2008

*Primary Examiner* — Allyson N Trail
(74) *Attorney, Agent, or Firm* — Oliff PLC (57) ABSTRACT

A baggage search method including following processes: an information acquisition process for acquiring a search target information including a search target image of a search target baggage and a target ID stored in a radio tag attached to the search target baggage, an image collation process for collating a pictured area that contains at least a part of a baggage group containing the search target baggage selected by an operator with the search target image included in the search target information by a processing unit, a displaying process for displaying the pictured area highlighting a baggage area in which the target baggage is included and an ID collation process which the processing unit collates an ID of the radio tag read by the tag communication unit of an operator terminal operated by the operator with the target ID included in the search target information.

12 Claims, 6 Drawing Sheets

(58) Field of Classification Search
USPC .......................................................... 235/451
See application file for complete search history.

(56) References Cited

U.S. PATENT DOCUMENTS

| | | | |
|---|---|---|---|
| 2018/0022473 A1* | 1/2018 | Jacobsen | B65G 43/08 |
| | | | 198/301 |
| 2018/0111699 A1 | 4/2018 | Imseeh | |
| 2020/0334630 A1* | 10/2020 | Al Issa | G06Q 10/02 |
| 2021/0200968 A1* | 7/2021 | Cohen | G06Q 10/0833 |
| 2021/0221535 A1* | 7/2021 | Hotta | G06V 20/52 |
| 2021/0342966 A1 | 11/2021 | Watanabe et al. | |
| 2022/0058762 A1* | 2/2022 | Goddard | G06K 7/1404 |
| 2023/0004927 A1* | 1/2023 | Sikka | G06Q 10/087 |
| 2023/0031219 A1* | 2/2023 | Ezrahi | B64F 1/368 |
| 2023/0186509 A1* | 6/2023 | Ryan | G06V 10/774 |
| | | | 382/103 |
| 2023/0348108 A1* | 11/2023 | Tsujimoto | B64F 1/366 |

* cited by examiner

BAGGAGE SEARCH METHOD AND A BAGGAGE INFORMATION MANAGEMENT SYSTEM

CROSS-REFERENCING RELATED APPLICATIONS

A present application is based on Patent Application No. 2021-20317, filed in Japan on Feb. 11, 2021. This application invokes by reference, throughout, the contents of the underlying application.

TECHNICAL FIELD

This application relates to a baggage search method and a baggage information management system that search a search target baggage such as airline baggage.

BACKGROUND TECHNOLOGY

In an airport, when a passenger does not show up at a departure gate, it is called NO SHOW. In the event of the NO SHOW is occurred, security concerns will require the unloading of the baggage once it is on board the aircraft. The removal and unloading of the baggage by the operator start when the relevant baggage number is displayed of the operator terminal such number is informed by the airport staff at the boarding gate. The operator will search the baggage based on this relevant baggage number.

Patent Document 1 discloses a technique to reduce the time required for searching an unloading baggage. The technology disclosed in Patent Document 1 utilizes a baggage tag (RF baggage tag below) with the RF tag issued at a check-in counter.

In the technology disclosed in Patent Document 1, the RF baggage tag is read when the baggage is loaded on an aircraft to understand a loading order and an area that includes the loading position of the baggage on the aircraft. The search time can be reduced compared to searching only by baggage number because the area containing the baggage loading location can be grasped. At the check-in counter, a photograph of the baggage is taken to obtain an image of the baggage, which is then used for search.

PRIOR ART LITERATURE

Patent Literature

Japanese Patent Laid-Open 2020-55691 Publication

SUMMARY OF THE INVENTION

In the technology of Patent Document 1, after the area containing the loading position of the baggage is grasped, the operator searches the relevant baggage visually based on the baggage image. Therefore, the search time is not shortened enough. Accordingly, further shortening of search time is required. There may be also a risk of errors if visual comparisons with the baggage images are used to determine whether the baggage is in question.

This disclosure is made in light of these circumstances. The object of this disclosure is to provide a baggage search method and a baggage information management system that could reduce a time required to search for a search target baggage while suppressing mistakes.

The above object is achieved by a combination of features described in an independent claim. Dependent claims provide further favorable examples. The symbols in parentheses in the claims indicate the correspondence with the specific forms described in the embodiment described later as one embodiment, and do not limit the technical scope of claims.

One disclosure regarding a baggage search method to achieve the above objectives is a baggage search method in which an operator searches for a search target baggage with a radio tag using an operator terminal (60). The operator terminal is equipped with a search information acquisition unit (61), a tag communication unit (62), a camera (63), a display unit (64), and a processing unit (66) as one unit or separately. The baggage search method in this disclosure includes the following processes. An information acquisition process (S 11) in which the search information acquisition unit acquires a search target information including a search target image which is a photographed image of the search target baggage and a target ID stored in the radio tag attached to the search target baggage. An image collation process (S 14) which the processing unit collates a pictured area including at least a part of a search target baggage group which includes the search target baggage shoot by the camera of the operator terminal operated by the operator with the search target image included in the search target information. A displaying process (S 16, S 20) for displaying the pictured area highlighting a baggage area in which the search target baggage is included when the processing unit determines that the pictured area includes the search target image.

An ID collation process (S 17) which the processing unit collates an ID of the radio tag read by the tag communication unit of the operator terminal operated by the operator with the target ID include in the search target information.

In the baggage search method of the present disclosure, since the search target baggage is searched by the image collation, it is possible to quickly find the search target baggage compared with the case of visual search. In addition, as it also matches the target ID of the radio tag, mistakes could be suppressed.

In the above baggage search method, the following configuration may be included. The operator terminal further includes an orientation estimation unit (65) that estimates an estimated orientation of the radio tag with respect to the operator terminal based on a response radio signal from the radio tag received by the tag communication unit. In the displaying process the processing unit displays a no existing fact that the processing unit determines that the search target image is not included in the pictured image on the display unit. An orientation estimating process (S 21) for displaying the estimated orientation estimated by the orientation estimating unit on the display unit. The estimated orientation is displayed after the no existing fact is displayed on the display unit.

By estimating the orientation in which the radio tag is located, the searching time for the search target baggage could be reduced, rather than searching the search target baggage only visually.

Also, after the orientation estimation process, the image collation process may be re-executed.

When the orientation in which the radio tag is located can be estimated, the location of the search target baggage can be estimated. The photographed image is changed based on the estimation result of the orientation estimation process, and the image collation process is re-executed. In this way, the search time for the search target baggage could be reduced rather than visually searching for the search target baggage after the orientation estimation process.

The ID collation process may also be a first ID collation process. The ID collation process may include a second ID collation process the processing unit determines whether an ID of the radio tag acquired by the tag communication unit of the operator terminal operated by the operator after the orientation estimating process matches with the target ID of the search target information.

When a baggage that may be the search target baggage is found by orientation estimation process, the ID is also checked to see if it is the target ID of the search target baggage. Accordingly, mistakes in check could be reduced.

The baggage search method may include a prior-orientation estimation process (S13A) which estimates an orientation of the radio tag by using the orientation estimation unit. The prior-orientation estimation process is executed after the information acquisition process and before the image collation process.

By estimating the orientation in which the radio tag is present before the first image collation process, the initial shooting range of the pictured area can be determined from the orientation estimation process. By determining the initial shooting range of the pictured area based on the orientation estimation, it is easy to determine the initial shooting range of the pictured area to include the search target baggage. It could reduce the time it takes to collate images, thereby reducing the time to search for the search target baggage.

The image collation process may be performed based on a comparison of a R value, a G value and a B value of the search target image with the R value, the G value and the B value of the pictured area.

By comparing images by the R value, the G value, and the B value, it is possible to suppress the mistake that a baggage that is not the item to be searched is the search target baggage.

The search target information may include a hue, a brightness and a saturation of at least a part of the search target baggage. The operator terminal may include a colorimeter measures the hue, the brightness and the saturation. The processing unit may collate the hue, the brightness and the saturation measured by the colorimeter with the hue, the brightness and the saturation of the search target information.

By collating the hue, the brightness and the saturation, it is possible to perform the collation with high accuracy even if the brightness at the time of the search is different from the time when the image of the search target baggage was taken.

One disclosure regarding ae baggage information management system for achieving the above object is the baggage information management system for managing a target image of a search target baggage by associating with a target ID stored in a radio tag attached to the search target baggage. The baggage information management system includes the following configurations. A camera (30) which photographs the search target baggage being conveyed by a conveyance line. A tag reader (40) which is installed in a position capable of communicating with the radio tag attached to the search target baggage being conveyed by the conveyance line and acquires the target ID stored in the radio tag. A memory unit (22) which memorizes a search target information including the target image and the target ID stored in the radio tag attached to the search target baggage. A control unit (21) which stores the target image of the search target baggage photographed by the camera and the target ID read by the tag reader at a timing when the search target baggage is photographed by the camera as the search target information in association with each other in the memory unit. A wireless communication unit (23) which wirelessly transmits the search target information stored in the memory unit to an operator terminal used by an operator searching for the search target baggage as the search target information.

As the camera and the tag reader are configured as described above, the number of the cameras and the tag readers could be reduced as compared with the case where the cameras and the tag readers are provided for each counter handling the baggage.

EMBODIMENTS FOR CARRYING OUT THE INVENTION

Figure 1:
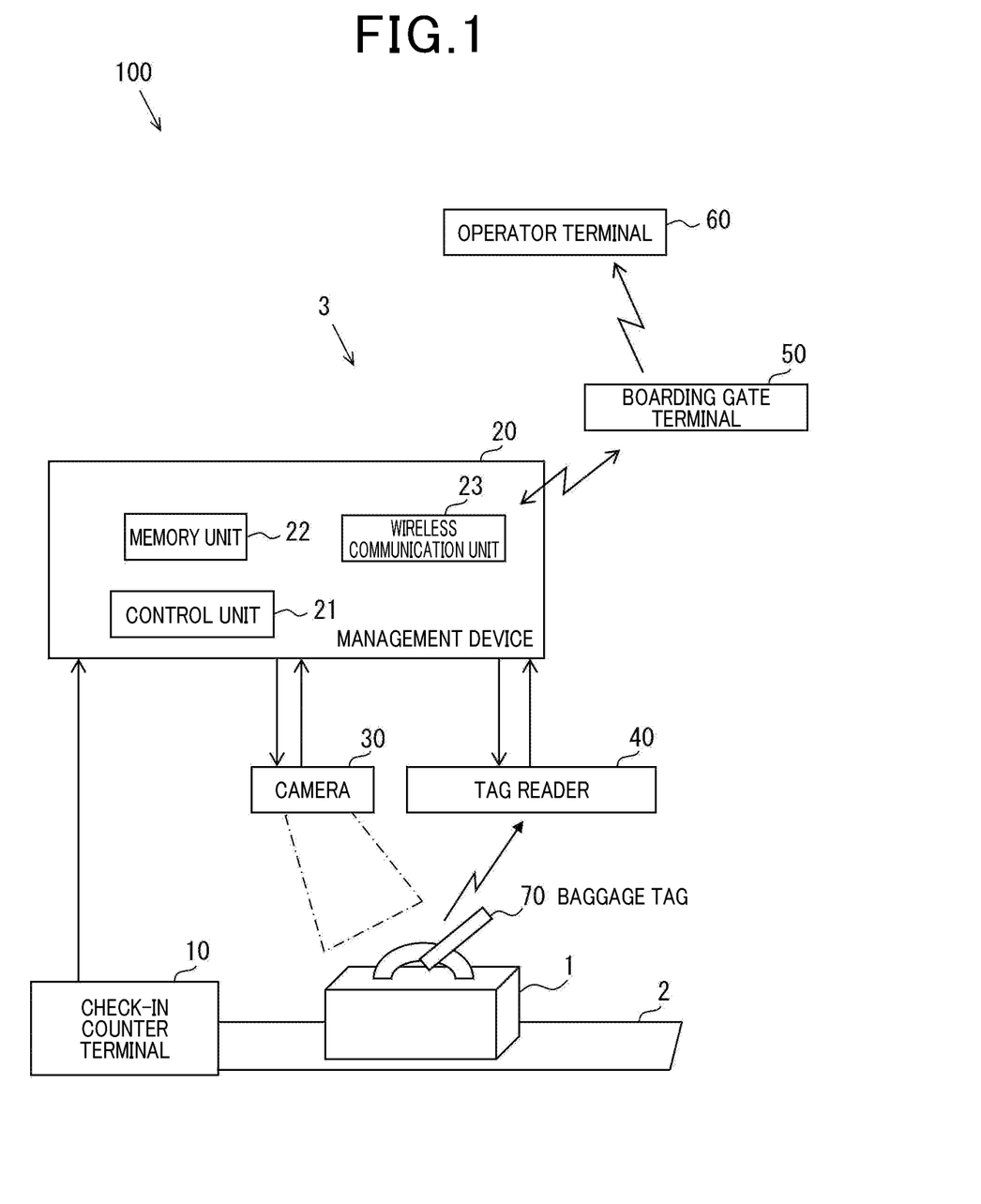
FIG. 1 shows the configuration of a baggage search system 100.

Embodiments are described below based on the drawings. FIG. 1 shows the configuration of a baggage search system 100. The baggage search system 100 is a system for searching a search target baggage 1. The search target baggage 1 in this embodiment is a baggage 1 of a passenger boarding an airplane.

The baggage search system 100 includes a check-in counter terminal 10, a management device 20, a camera 30, a tag reader 40, a boarding gate terminal 50, and an operator terminal 60. Of these, except for the operator terminal 60, the configuration is a baggage information management system 3.

The check-in counter terminal 10 is installed at the check-in counter of the airport. There are multiple check-in counters, and the check-in counter terminal 10 is installed for each check-in counter. The check-in counter terminal 10 issues a baggage tag 70. The baggage tag 70 is a radio tag and baggage number is stored electronically in the baggage tag 70. The baggage tag 70 is a passive tag but may be an active tag.

The baggage number corresponds to an identification that is a target ID that identifies the baggage 1. The baggage number is sometimes referred to as the LPN (License Plate Number). The target ID of the baggage 1 need only identify the baggage 1 and need not be a number.

The check-in counter terminal 10 can transmit and receive signals with wire or wirelessly with the management device 20. The check-in counter terminal 10 associates the names of the passengers boarding the aircraft with their baggage numbers and sends them to the management device 20. The baggage 1 to which the baggage tag 70 is attached at the check-in counter is carried on conveyance line 2.

The management device 20 includes a control unit 21, a memory unit 22, and a wireless communication unit 23. An example of the management device 20 is a passenger information management system (DCS). The control unit 21 controls the memory unit 22 and the wireless communication unit 23. The control unit 21 stores the name and baggage number of the passenger provided by the check-in counter terminal 10 and a photographed image of the baggage 1 taken by the camera 30 in the memory unit 22 as a set of a search target information. The control unit 21 sends the search target information selected from the baggage information stored in the memory unit 22 to the boarding gate terminal 50 via the wireless communication unit 23.

The control unit 21 also controls the camera 30 and the tag reader 40. The camera 30 and the tag reader 40 may be controlled by a different device than the management device 20.

The camera 30 is set at a position where the baggage 1 moving on the conveyance line 2 can be photographed. The camera 30 captures a color image. The image captured by the camera 30 is later used for collation with the photographed image in image collation (step S 14). Photographs are often taken outdoors. Since it is checked against the photographed image, it is desirable to have a light source that illuminates the shooting range of the camera 30. It is preferable that the light emitted by the light source is close to the color of natural light.

The tag reader 40 is installed at a position where the information stored in the baggage tag 70 attached to the baggage 1 can be read when the baggage 1 is positioned at a position where the camera 30 can photograph it. The camera 30 and the tag reader 40 are also capable of transmitting and receiving signals to and from the management device 20 with wire or wirelessly.

Figure 2:
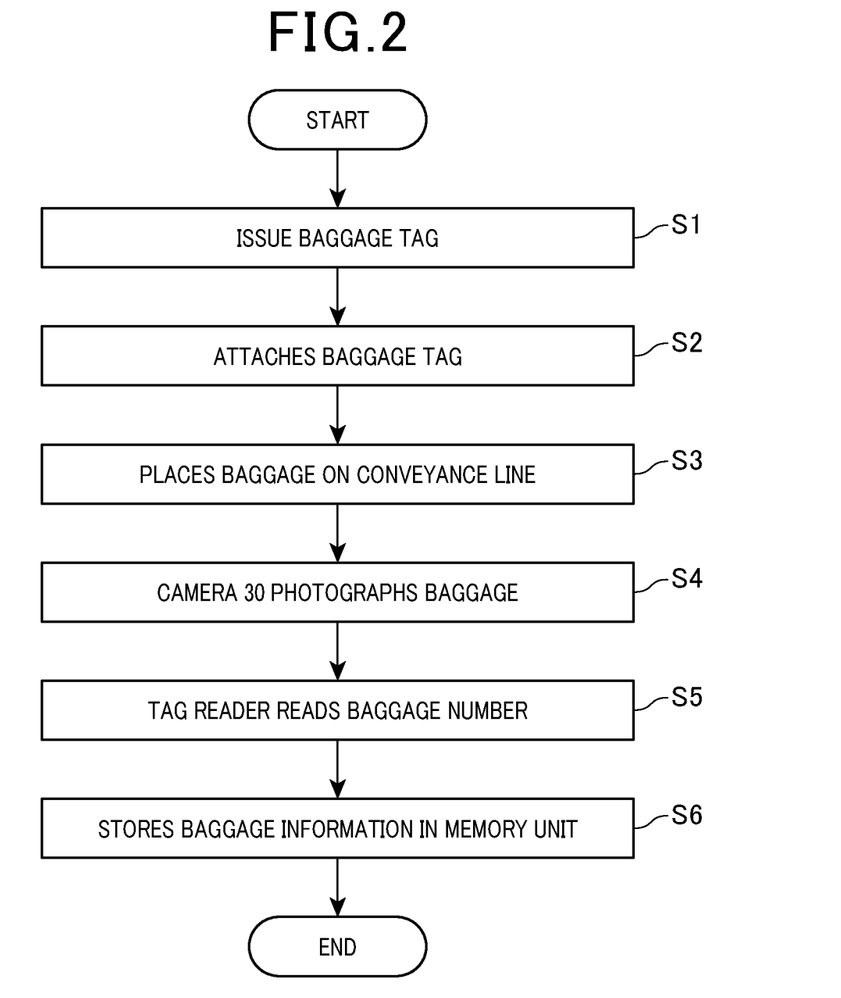
FIG. 2 shows the process of storing baggage information in a memory unit 22.

FIG. 2 shows the processing for storing the baggage information in the memory unit 22. In step S1, the check-in counter terminal 10 is operated by a ground staff of the airline to issue the baggage tag 70. The baggage tag 70 electronically stores the baggage number. In step S2, the ground staff of the airline attaches the baggage tag 70 issued in step S1 to the baggage 1.

In step S3, the airline ground staff places the baggage 1 with the baggage tag 70 attached on the conveyance line 2. In step S4, the camera 30 photographs the baggage 1 moving on the conveyance line 2. The photographing timing can be determined, for example, by detecting by the sensor that the baggage 1 moving on the conveyance line 2 has reached the picturing area of the camera 30.

In step S5, the tag reader 40 communicates with the baggage tag 70 to read the baggage number stored in the baggage tag 70. The camera 30 transmits the photographed image to the management device 20. The tag reader 40 transmits the read baggage number to the management device 20.

In step S6, the control unit 21 generates baggage information and stores the baggage information in a memory unit 22. As mentioned above, the baggage information includes the name of the passenger, the baggage number, and the photographed image of the baggage 1. The photographed image of the baggage 1 is a color image and the color of each pixel is indicated by R value, G value and B value.

The names and baggage numbers of the passengers are transmitted from the check-in counter terminal 10 to the control device 20. The photographed image of baggage 1 is transmitted from the camera 30 to the management device 20. At the same time as this photographed image, the baggage number is transmitted from the tag reader 40 to the management device 20. Based on the baggage number transmitted from the tag reader 40 and the baggage number transmitted from the check-in counter terminal 10, the control unit 21 associates the image transmitted from the camera 30 with the baggage number and the name of the passenger. It generates baggage information by associating images with baggage numbers and passengers' names.

The boarding gate terminal 50 is capable of wireless communication with the management device 20. When NO SHOW occurs, the boarding gate terminal 50 transmits the name of the passenger who did not appear at the boarding gate to the management device 20. The management device 20 extracts the baggage information including the name of the passenger from the memory unit 22. The extracted baggage information is transmitted to the boarding gate terminal 50. The baggage information transmitted to the boarding gate terminal 50 is information about the baggage 1 (Below is the search target baggage.) to be searched. Hereafter, the baggage information sent from the management device 20 to the boarding gate terminal 50 is used as the search target information. The image of the search target baggage 1 included in the search target information is a pre-taken photographed image of the search target baggage.

The search target information may include a date, a flight number and an onboard ULD number. The onboard ULD number is the number of the unit load device (ULD) container in which the search target baggage is loaded.

The boarding gate terminal 50 can communicate wirelessly with the operator terminal 60 and transmits the search target information acquired from the management device 20 to the operator terminal 60. The search target information may be transmitted from the management device 20 to the operator terminal 60 without passing through the boarding gate terminal 50.

Figure 3:
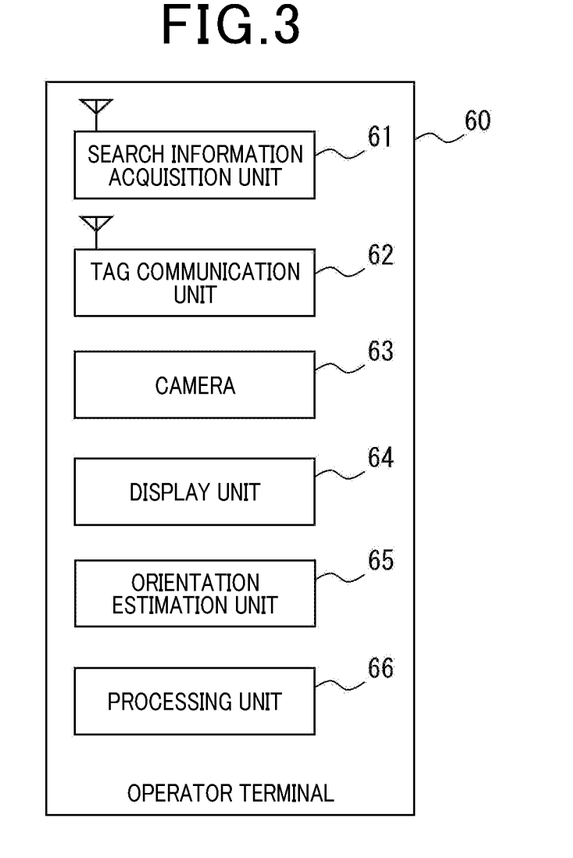
FIG. 3 shows the configuration of an operator terminal 60.

The operator terminal 60 is carried by the operator who searches for the search target baggage. FIG. 3 shows the configuration of the operator terminal 60. The operator terminal 60 is equipped with a search information acquisition unit 61, a tag communication unit 62, a camera 63, a display unit 64, an orientation estimation unit 65, and a processing unit 66. The operator terminal 60 of this embodiment is provided with these in one piece. However, some components may be separate entities. For example, the camera 63 and the tag communication part 62 may be separated from each other.

The search information acquisition unit 61 communicates wirelessly with the boarding gate terminal 50 to acquire the information of the search target baggage. The search information acquisition unit 61 is equipped with a radio unit. The communication between the radio unit and the boarding gate terminal 50 is, for example, wide-area communication using a public communication line network. The communication between the radio unit and the boarding gate terminal 50 may be short-range wireless communication such as wireless LAN.

Figure 4:
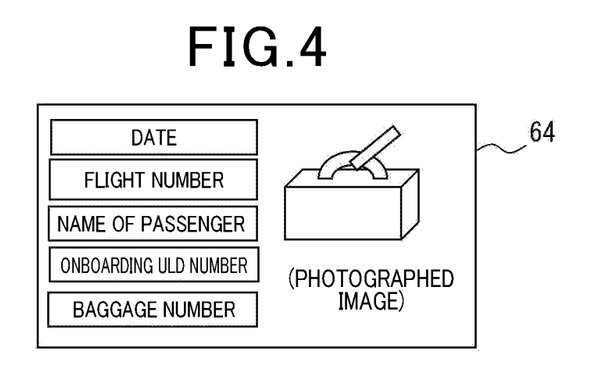
FIG. 4 shows an example of the search target image.

The tag communication unit 62 communicates with the baggage tag 70 and reads the information stored in the baggage tag 70. The tag communication unit 62 is equipped with a function for measuring the strength of radio waves from the baggage tag 70. The camera 63 captures a color image. The display unit 64 displays images taken by the camera 63, the photographed image of the search target baggage, etc. The photographed image of the search target baggage is an image drawn based on the search target information. FIG. 4 shows an example of the items displayed on the display unit.

The search target information shown in FIG. 4 shows the date, the flight number, the name of the passenger, the onboarding ULD number, the baggage number, and the photographed image of the search target baggage.

The orientation estimation unit 65 estimates the orientation of the baggage tag 70 with respect to the operator terminal 60 based on the strength of the response radio signal from the baggage tag 70 received by the tag communication unit 62. One example of the method for estimating the orientation is equipped with a tag communication unit 62 whose directivity can be varied. While changing the directivity of the tag communication unit 62 in various directions, the response radio signal intensity from the baggage tag 70 is measured in each directivity. To make the tag communication unit 62 variable in directivity, the tag communication unit 62 can be configured with an adaptive array antenna. Instead of measuring the response radio signal strength, or in addition to measuring the response radio signal strength, the response radio phase may be measured, and the phase may be used to estimate the orientation.

The processing unit 66 controls the search information acquisition unit 61, the tag communication unit 62, the camera 63, and the display unit 64. The processing unit 66 acquires the orientation estimation result obtained by the orientation estimation unit 65. The processing unit 66 may have the function of the orientation estimation unit 65. The processing unit 66 may be realized by a configuration having at least one processor.

(Baggage Search Method)

Figure 5:
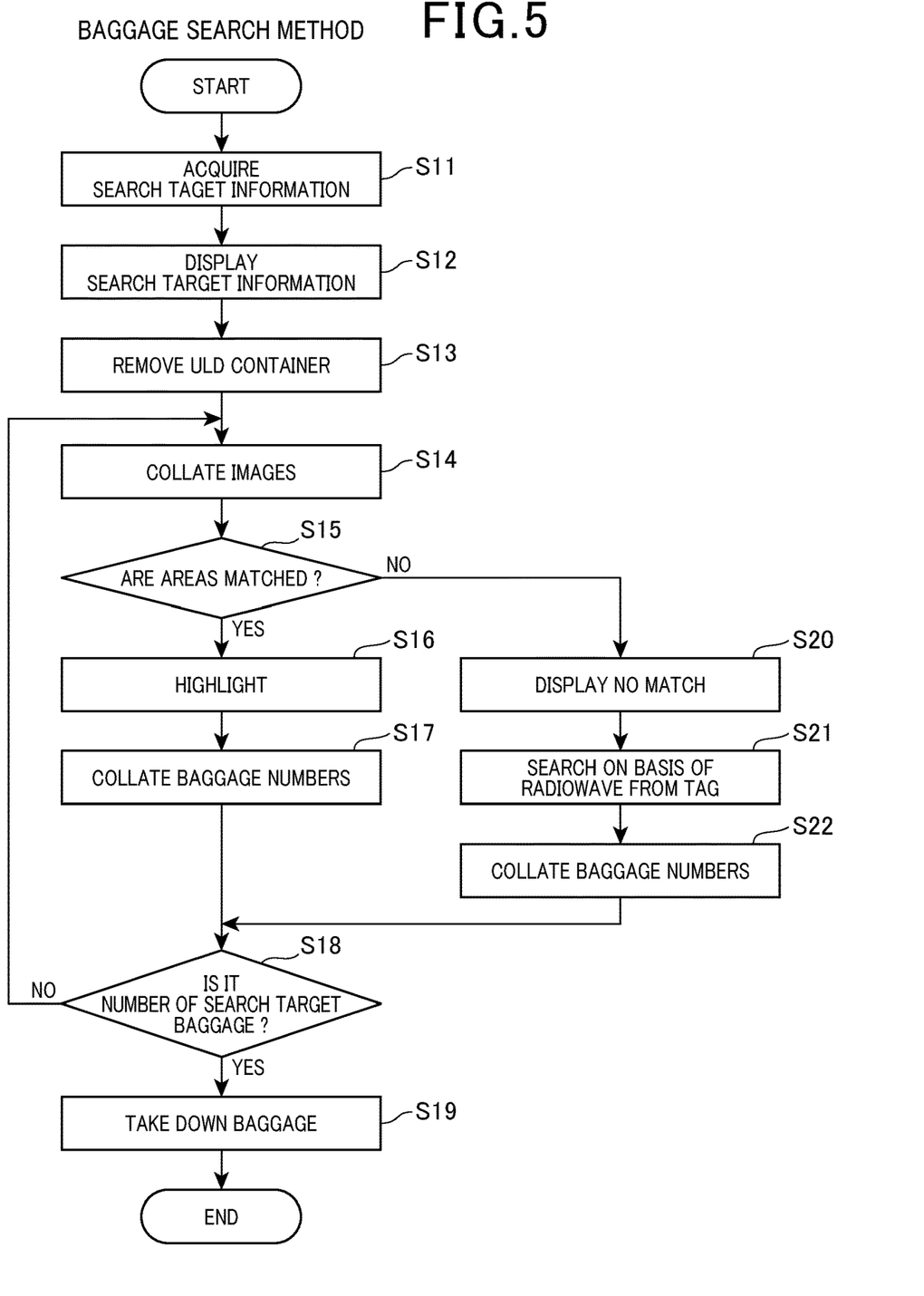
FIG. 5 is a flow chart showing the process of the baggage search method of the first embodiment.

The operator searches the search target baggage by executing the baggage search method using the operator terminal 60. FIG. 5 shows the procedure of the baggage search method. The baggage search method is explained hereinafter.

Step S 11 is an information acquisition process, in which the search information acquisition unit 61 acquires the information on the object of search. In step S 12, the processing unit 66 displays the search target information on the display unit 64 based on the search target information. In step S 13, the operator checks the ULD number by looking at the display and removes the relevant ULD container from the aircraft.

In step S 14, the operator operates the operator terminal 60 after opening the unloaded ULD container and uses the camera 63 to photograph the pictured area selected by the operator. The operator photographs the pictured area as an area containing at least a portion of the baggage group containing the search target baggage. Step S 14 is an image collation process, in which after the image is taken, the image of the pictured area (photographed image) is collated with the search target baggage image included in the search target information. The collation may be performed automatically after shooting or when a collation instruction operation is performed by the operator.

The image collation process determines whether the baggage 1 with the shape of the baggage to be searched, which can be determined from the image of the search target baggage, is present in the photographed image. In the image collation process, shapes are collated. Such shape matching not only uses the exact shape of the baggage 1, which can be cut from the image, but also determines whether the shape matches when the baggage 1 is rotated arbitrarily.

In addition to collate shapes, the image collation process also involves matching colors. For color collation, the image area having the shape of the search target baggage in the photographed image and the area judged to be included in the photographed image in the image of the search target baggage are defined as the collation target area. In the collation area, the R, G and B values of the pixels corresponding to each other in the photographed image and the image of the search target baggage are compared. This comparison determines whether the color of the area corresponding to the shape represents the color of the same piece of baggage 1.

Figure 6:
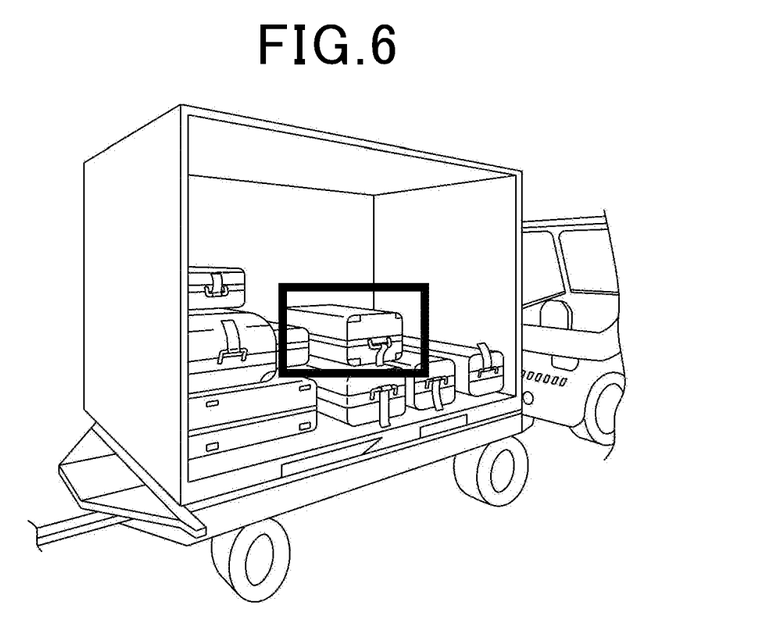
FIG. 6 shows an example of an image displayed in S 16.

In step S 15, as a result of the collation in step S 14, it is determined whether there is an area in the photographed image that matches at least a part of the search target baggage. If the judgment result of step S 15 is YES, the process proceeds to step S 16. In step S 16, the photographed image highlighting the image portion of the search target baggage is displayed on the display unit 64. FIG. 6 shows an example of the photographed image displayed in step S 16. In the example of FIG. 6, the image part of the search target baggage is highlighted by enclosing the image part of the search target baggage in a square frame.

Step S 17 is an ID collation process and a first ID collation process. In step S 17, the operator matches the baggage number of the baggage tag 70 attached to the highlighted baggage 1. Matching involves the following steps: The operator looks at the image displayed on the display unit 64 and approaches the highlighted baggage 1. The reason for approaching is that if the highlighted baggage 1 is too far away, it may communicate with the baggage tag 70 attached to a different baggage 1 than the highlighted baggage 1.

The operator approaches to a position where he or she can communicate with the baggage tag 70 attached to the highlighted baggage 1 instead of the baggage tag 70 attached to the other baggage 1. After approaching, the operator performs an ID collation process on the operator terminal 60.

When the ID collation process is performed on the operator terminal 60, the tag communication unit 62 electronically reads the baggage number from the baggage tag 70 attached to the baggage 1. The processing unit 66 determines whether the baggage number read by the tag communication unit 62 matches the baggage number included in the search target information.

In step S 18, as a result of the ID collation process in step S 17, it is determined whether or not the baggage number read by the tag communication unit 62 was the baggage number of the search target baggage. The judgment result is displayed on the display unit 64. If the result shows that the baggage number read by the tag communication unit 62 is the baggage number of the search target baggage, the result of the judgment in step S 18 is YES.

If the result of the judgment in step S 18 is YES, the operator takes down the baggage 1 to which the baggage tag 70, whose baggage number was read by the tag communication section 62, is attached (step S 19). Then, the operator operates the operator terminal 60 to send a search completion notice to the management device 20.

If the judgment result displayed on the display unit 64 is the result that the baggage number read by the tag communication unit 62 is not the baggage number of the search target baggage (step S 18: NO), the operator re-executes step S 14. When re-running, a different pictured area is photographed from the previous shooting area. If the result of the determination in step S 18 is NO, the procedure may proceed to step S 21.

The case where the judgment result in step S 15 is NO is explained hereinafter. If the result of the determination in step S 15 is NO, the process proceeds to step S 20. In step S 20, the processing unit 66 displays on the display unit 64 that there is no area in the photographed image that matches the image of the search target baggage. The processing unit 66 displays on the display unit 64 that the photographed image does not include the image of the search target baggage. This step S 20 and the aforementioned step S 16 are the display steps.

Step S 21 is the orientation estimation process. In step S 21, the operator actuates the orientation estimation unit 65. Based on the response radio signal from the baggage tag 70, the orientation estimation unit 65 estimates the direction of the baggage tag 70 with respect to the operator terminal 60. Step S 21 may be automatically executed after step S 20.

The orientation estimation unit 65 notifies the processing unit 66 of the estimation result. The processing unit 66 displays the estimated result on the display unit 64. With image matching, one piece of baggage 1 can be confirmed as a candidate. Even if the orientation estimation unit 65 performs azimuth estimation, the candidates cannot be narrowed down as much as image collation. For example, in the orientation estimation process, the azimuth can be narrowed down to a range of about 45 degrees.

The operator searches for the search target baggage using the estimated result displayed on the display unit 64 and the image of the search target baggage contained in the screen of the display unit.

When the operator finds the baggage 1 which appears to be the search target baggage, he or she approaches the baggage 1 to a distance where there is no communication with the baggage tag 70 which is mistakenly attached to the other baggage 1. Then, the operator performs the ID collation process on the operator terminal 60 (step S 22). Step S 22 is the second ID collation process. When the ID collation process is performed, the collation result is displayed in the display unit 64. The operator then performs the procedure shown in step S 18 and thereafter.

Summary of First Embodiment

In the baggage search method described in the first embodiment, the search target baggage is searched by the image collation process (step S 14). Compared with the case of visual search, it is possible to quickly find the baggage 1 that is likely to be the search target baggage. Therefore, the search time for searching the search target baggage can be reduced.

In addition, the baggage number read by communication from the baggage tag 70 is checked against the baggage number included in the search target information transmitted by the management device 20 to confirm whether the baggage is the search target baggage (Step S17, Step S18, Step S22). Therefore, taking down the wrong piece of baggage 1 can be prevented.

The operator terminal 60 is equipped with the orientation estimation unit 65. When the processing unit 66 determines that the image of the search target baggage is not included (step S15: NO), this is displayed on the display unit 64 (step S20). When the operator learns that the image collation could not be performed by looking at the displayed content of the display unit 64, he or she activates the orientation estimation unit 65 to estimate the direction in which the baggage tag 70 exists. By estimating the direction in which the baggage tag 70 is located, the searching time for the search target baggage can be shortened, compared with the searching the search target baggage only by visual inspection, using the image to be searched displayed on the operator terminal 60 as a clue.

In the image collation process, the R, G and B values of the image of the search target baggage are compared with the R, G and B values of the photographed image. In this way, it is possible to restrain the baggage 1 that is not the search target baggage from being judged as the search target baggage.

The camera 30 photographs the baggage 1 when the baggage 1 is being conveyed by the conveyance line 2. The tag reader 40 also reads the information from the baggage tag 70 attached to the baggage 1 when the baggage 1 is being conveyed by the conveyance line 2. The number of conveyance lines 2 is less than the number of check-in counters. Therefore, the number of the cameras 30 and the tag readers 40 can be reduced as compared to the case of providing the cameras 30 and the tag readers 40 for each check-in counter.

Second Embodiment

A second embodiment is described hereinafter. In the following descriptions of this second embodiment, the elements having the same number of codes as those used so far are the same as the elements having the same number in the earlier embodiment, except as specifically mentioned. If only part of the configuration is described, the previously described embodiment can be applied to other parts of the configuration.

Figure 7:
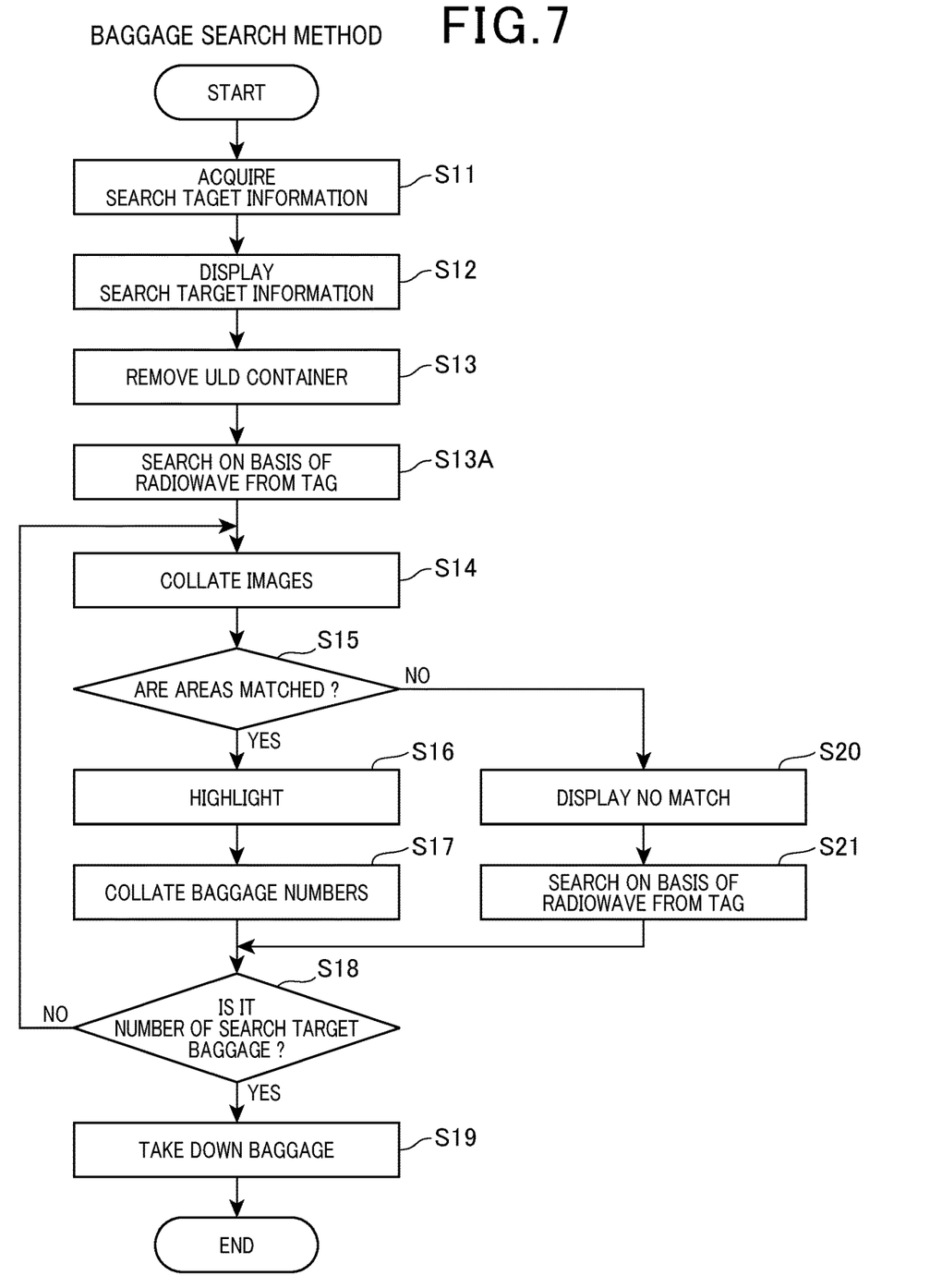
FIG. 7 is a flow chart showing the process of the baggage search method of the second embodiment.

FIG. 7 shows the second embodiment of the baggage search method. In the baggage search method shown in FIG. 7, after Step S 13 and before Step S 14, Step S 13 A, a prior orientation estimation process, is performed. The contents of step S 13 A are the same as those of step S 21.

In the second embodiment, the direction in which the baggage tag 70 is located is estimated after the search target information is acquired and before the first image collation process. This allows the initial shooting range to be determined based on the estimated orientation. It is easier to determine the initial pictured area to be the one that includes the search target baggage, thus reducing the time it takes for image collation to occur. As a result, the search time for the search target baggage can be reduced.

The baggage search method of the second embodiment does not perform step S22. After executing step S21, the image collation process (step S14) is executed again.

If the direction in which the baggage tag 70 is located can be estimated, the location in which the search target baggage is estimated to some extent. Therefore, the imaging range of the pictured area is changed based on the estimation result of the azimuth, and the image collation process (S 14) is re-executed. In this way, after orientation estimation, the search time for the search target baggage can be reduced rather than searching for the search target baggage only visually.

Although the above described the embodiment, the disclosed technique is not limited to the above-mentioned embodiment, and the following modifications are also included in the scope of disclosure. In addition, it can be implemented with various changes other than the following without deviating from the gist.

<Variation 1>

The search target information may also include the hue, the brightness and the saturation of the colorimetric area, which is at least a portion of the search target baggage. The hue, the brightness and the saturation are measured using a colorimeter and included as numerical values in the search target information. The hue, the brightness and the saturation measurements can be made at the check-in counter. Measurements of the hue, the brightness and the saturation may be made when the baggage 1 is moving on the conveyance line 2, such as at the same time as the camera 30 took the photographed image. The colorimetric site can be any location as long as the location of the measurement is also included in the search target information.

When the search target information includes the hue, the brightness and the saturation of the colorimetric area, the image collation process collates the hue, the brightness and the saturation in addition to collating the photographed image with the image contained in the search target information. Specifically, the colorimeter measures the hue, the brightness and the saturation of the colorimetric area for the baggage 1 that may be the search target baggage. The measured hue, brightness and saturation are compared with the hue, the brightness and the saturation of the colorimetric area of the search target baggage.

Matching of the hue, the brightness and the saturation can be done in place of comparing R, G and B values. When the hue, the brightness and the saturation are collated, the image collation process can be performed with high accuracy even if the brightness during the search is different from that when the camera 30 installed near the conveyance line 2 took the photographed image. Matching of the hue, the brightness and the saturation may be done in addition to comparing the R, G and B values.

<Variation 2>

In the baggage search method shown in FIG. 5, similarly to FIG. 7, step S13 A may be performed after step S13 and before step S14.

<Variation 3>

The baggage 1 does not have to be contained in the ULD container and carried on the aircraft. The baggage 1 may be stored directly in the designated storage space on the aircraft.

<Variation 4>

At the time of photographing the baggage 1 by the camera 30, an index to know the size of baggage 1, for example, a scale may be set beside the conveyance line 2 and photographed together. The scale may be built into the camera 63 provided in the operator terminal 60. In this way, the size is added to the shape and color as the search target information, which makes the search easier.

The invention claimed is:

1. A baggage search method in which an operator searches for a search target baggage with a radio tag by using an operator terminal equipped with a search information acquisition unit, a tag communication unit, a camera, a display unit and a processing unit, the method including following processes:
    an information acquisition process in which the search information acquisition unit acquires a search target information including a search target image which is a photographed image of the search target baggage and a target ID stored in the radio tag attached to the search target baggage;
    an image collation process in which the processing unit collates a pictured area including at least a part of a search target baggage group which includes the search target baggage photographed by the camera of the operator terminal operated by the operator with the search target image included in the search target information;
    a displaying process for displaying the pictured area highlighting a baggage area in which the search target baggage is included when the processing unit determines that the pictured area includes the search target image; and
    an ID collation process in which the processing unit collates an ID of the radio tag read by the tag communication unit of the operator terminal operated by the operator with the target ID include in the search target information, wherein
    the operator terminal further includes an orientation estimation unit that estimates an estimated orientation of the radio tag with respect to the operator terminal based on a response radio signal from the radio tag received by the tag communication unit,
    wherein
    in the displaying process the processing unit displays a no existing fact that the processing unit determines that the search target image is not included in the pictured image on the display unit; and
    the baggage search method further includes:
        an orientation estimating process for displaying the estimated orientation estimated by the orientation estimation unit on the display unit, wherein the estimated orientation is displayed after the no existing fact is displayed on the display unit.

2. The baggage search method of claimed in claim 1, wherein the image collation process is re-executed after the orientation estimating process is executed.

3. The baggage search method of claim 1, wherein the ID collation process is a first ID collation process, and further including:
    a second ID collation process in which the processing unit determines whether an ID of the radio tag acquired by the tag communication unit of the operator terminal operated by the operator after the orientation estimating process matches with the target ID of the search target information.

4. The baggage search method of claim 3, further including:
    a prior-orientation estimation process for estimating an orientation of the radio tag by using the orientation estimation unit, wherein
    the prior-orientation estimation process is executed after the information acquisition process and before the image collation process.

5. The baggage search method of claim 1 further including:
    a prior-orientation estimation process for estimating an orientation of the radio tag by using the orientation estimation unit, wherein
    the prior-orientation estimation process is executed after the information acquisition process and before the image collation process.

6. The baggage search method of claim 5, wherein the image collation process is performed based on a comparison of a R value, a G value and a B value of the search target image with the R value, the G value and the B value of the pictured area.

7. The baggage search method of claim 1, wherein the image collation process is performed based on a comparison of a R value, a G value and a B value of the search target image with the R value, the G value and the B value of the pictured area.

8. The baggage search method of claim 1, wherein the search target information further includes a hue, a brightness and a saturation of at least the part of the search target baggage,
    the operator terminal further includes a colorimeter that measures the hue, the brightness and the saturation, and
    the processing unit collates the hue, the brightness and the saturation measured by the colorimeter with the hue, the brightness and the saturation of the search target information.

9. A baggage search method in which an operator searches for a search target baggage with a radio tag by using an operator terminal equipped with a search information acquisition unit, a tag communication unit, a camera, a display unit and a processing unit, the method including following processes:
    an information acquisition process in which the search information acquisition unit acquires a search target information including a search target image which is a photographed image of the search target baggage and a target ID stored in the radio tag attached to the search target baggage;

an image collation process in which the processing unit collates a pictured area including at least a part of a search target baggage group which includes the search target baggage photographed by the camera of the operator terminal operated by the operator with the search target image included in the search target information;

a displaying process for displaying the pictured area highlighting a baggage area in which the search target baggage is included when the processing unit determines that the pictured area includes the search target image; and an ID collation process in which the processing unit collates an ID of the radio tag read by the tag communication unit of the operator terminal operated by the operator with the target ID include in the search target information, wherein the image collation process is performed based on a comparison of a R value, a G value and a B value of the search target image with the R value, the G value and the B value of the pictured area.

10. The baggage search method of claim 9, wherein the search target information further includes a hue, a brightness and a saturation of at least a part of the search target baggage, the operator terminal further includes a colorimeter that measures the hue, the brightness and the saturation, and the processing unit collates the hue, the brightness and the saturation measured by the colorimeter with the hue, the brightness and the saturation of the search target information.

11. A baggage search method in which an operator searches for a search target baggage with a radio tag by using an operator terminal equipped with a search information acquisition unit, a tag communication unit, a camera, a display unit and a processing unit, the method including following processes:

an information acquisition process in which the search information acquisition unit acquires a search target information including a search target image which is a photographed image of the search target baggage and a target ID stored in the radio tag attached to the search target baggage;

an image collation process in which the processing unit collates a pictured area including at least a part of a search target baggage group which includes the search target baggage photographed by the camera of the operator terminal operated by the operator with the search target image included in the search target information;

a displaying process for displaying the pictured area highlighting a baggage area in which the search target baggage is included when the processing unit determines that the pictured area includes the search target image; and an ID collation process in which the processing unit collates an ID of the radio tag read by the tag communication unit of the operator terminal operated by the operator with the target ID include in the search target information, wherein the search target information further includes a hue, a brightness and a saturation of at least a part of the search target baggage, the operator terminal further includes a colorimeter that measures the hue, the brightness and the saturation, and the processing unit collates the hue, the brightness and the saturation measured by the colorimeter with the hue, the brightness and the saturation of the search target information.

12. A baggage information management system for managing a target image of a search target baggage by associating with a target ID stored in a radio tag attached to the search target baggage, the baggage information management system comprising a camera to photograph the search target baggage being conveyed by a conveyance line, a tag reader installed in a position capable of communicating with the radio tag attached to the search target baggage being conveyed by the conveyance line and that acquires the target ID stored in the radio tag, a memory unit memorizing a search target information including the target image and the target ID stored in the radio tag attached to the search target baggage, a control unit storing the target image of the search target baggage photographed by the camera and the target ID read by the tag reader at a timing when the search target baggage is photographed by the camera as the search target information in association with each other in the memory unit, a wireless communication unit wirelessly transmitting the search target information stored in the memory unit to an operator terminal used by an operator searching for the search target baggage as the search target information, wherein the operator terminal further includes:

a tag communication unit that communicates with the radio tag and reads the search target information stored in the radio tag, an orientation estimation unit that estimates an orientation of the radio tag with respect to the operator terminal based on a response radio signal from the radio tag received from the tag communication unit, and a display unit that displays the orientation estimated by the orientation estimation unit, wherein the display unit displays a no existing fact that the search target image is not included in the pictured image on the display unit; and the orientation estimation unit displays the estimated orientation estimated by the orientation estimation unit on the display unit after the no existing fact is displayed on the display unit.

\* \* \* \* \*